(12) United States Patent
Rankin

(10) Patent No.: US 6,173,605 B1
(45) Date of Patent: Jan. 16, 2001

(54) SYSTEM AND METHOD FOR DETECTING SNAP RING POSITION

(75) Inventor: Brent C. Rankin, Lima, OH (US)

(73) Assignee: Honda of America Manufacturing, Inc., Marysville, OH (US)

( * ) Notice: Under 35 U.S.C. 154(b), the term of this patent shall be extended for 0 days.

(21) Appl. No.: 09/235,725

(22) Filed: Jan. 22, 1999

(51) Int. Cl.⁷ .................................................. B23Q 17/00
(52) U.S. Cl. .......................................................... 73/119 R
(58) Field of Search .................................. 73/116, 117.2, 73/117.3, 118.1, 119 R

(56) References Cited

U.S. PATENT DOCUMENTS

| | | | |
|---|---|---|---|
| 4,351,097 | * | 9/1982 | Hashimoto et al. . |
| 4,789,351 | * | 12/1988 | Fisher, Jr. et al. . |
| 4,875,786 | * | 10/1989 | DeWachter . |
| 5,059,844 | * | 10/1991 | Anstine . |
| 5,875,536 | * | 3/1999 | Ring . |

* cited by examiner

Primary Examiner—Eric S. McCall
(74) Attorney, Agent, or Firm—Barbara Joan Haushalter; Alan T. McDonald

(57) ABSTRACT

A detection system and method is provided for detecting the position of a snap ring in a bearing assembly of a transmission system. A spreader pin and a bearing are installed directly into spreader segments. Spreader segments receive the bearing. A conductive sensor is then introduced in a surface of the spreader segments, whereby an incorrectly positioned snap ring will make contact with the conductive sensor, causing a current to flow through the spreader segments and through the snap ring to the conductive sensor. The primary advantage provided by the present invention is to detect the position of a snap ring during the pressing operation of pressing bearings into transmission cases, thereby avoiding damage to the transmission case caused by incorrect positioning of the snap ring.

16 Claims, 6 Drawing Sheets

SYSTEM AND METHOD FOR DETECTING SNAP RING POSITION

FIELD OF THE INVENTION

This invention relates generally to a vehicle transmission assembly, and more particularly, to determining the position of a snap ring in a vehicle transmission.

BACKGROUND OF THE INVENTION

As part of the transmission assembly process, a bearing press is used to press bearings into the rear of the transmission case. The bearing aperture is inside the transmission, making the bearing press installation difficult to observe. At the same time the bearing is being pressed into the case, a snap ring is installed in a snap ring groove to hold the bearing in its proper location. The location of the snap ring is critical during the pressing operation. That is, if the snap ring is not in the proper position, the transmission case can snap or break.

Related to the snap ring detection system and method described and claimed herein is a magnichanical sensor described in a first copending patent application having Ser. No. 09/235,890 and filing date of Jan. 22, 1999, and having the common inventor and assignee herewith. An apparatus and method for fabrication and testing of the sensor described and claimed herein and the magnichanical sensor of the first copending patent application is described in a second copending patent application having a Ser. No. 09/235,889 and filing date of Jan. 22, 1999, and having the common inventor and assignee herewith. The first copending patent application having Ser. No. 09/235,890 and the second copending patent application having Ser. No. 09/235,889 are incorporated herewith by reference.

Therefore, among the purposes of this invention is to detect the position of a snap ring in a transmission assembly process.

Also a purpose of this invention is the novel snap ring device enhancement to facilitate detection of the snap ring during the transmission assembly process.

SUMMARY OF THE INVENTION

These purposes are achieved by the snap ring position detection system and method according to the present invention, wherein the snap ring is configured to accommodate the detection of the correct orientation of the snap ring in the snap ring groove, to hold the bearing in its proper location.

In accordance with one embodiment of the present invention, a detection system is provided for detecting the position of a snap ring in a bearing assembly of a transmission system. The bearing and the spreader pin are installed directly into the spreader segments. A conductive sensor is then introduced in a surface of the spreader segments, whereby an incorrectly positioned snap ring will make contact with the conductive sensor, causing a current to flow through the spreader segments and through the snap ring to the conductive sensor.

The primary advantage provided by the present invention is to detect the position of a snap ring during the pressing operation of pressing bearings into transmission cases, thereby avoiding damage to the transmission case caused by incorrect positioning of the snap ring.

Other objects and advantages of the invention will be apparent from the following description, the accompanying drawings and the appended claims, to which reference may be had for a full understanding of the nature of the present invention.

DESCRIPTION OF THE PREFERRED EMBODIMENT

Figure 1:
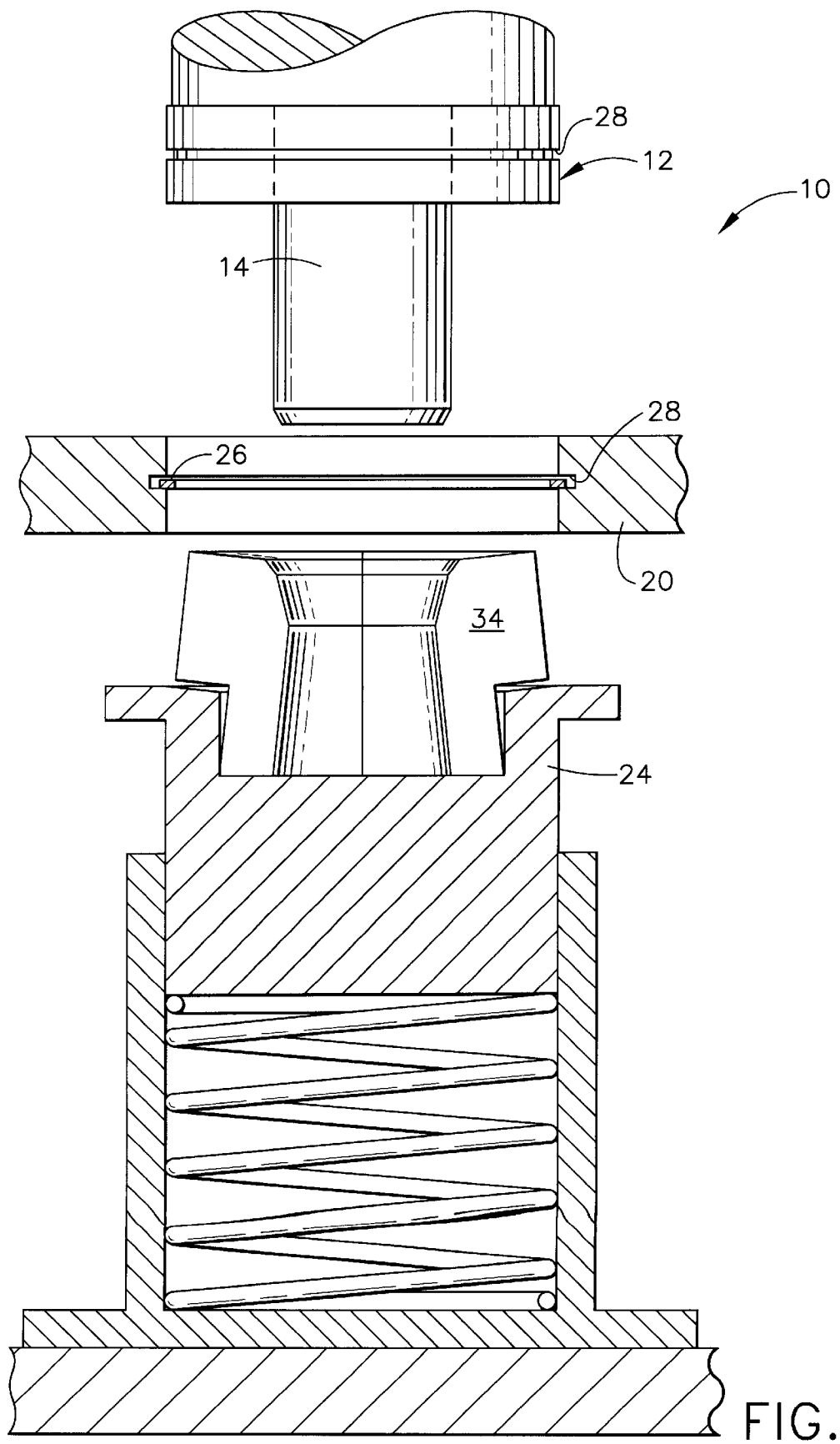
FIGS. 1—3 illustrate a transmission assembly process whereby a snap ring is pressed into a groove.
Figure 2:
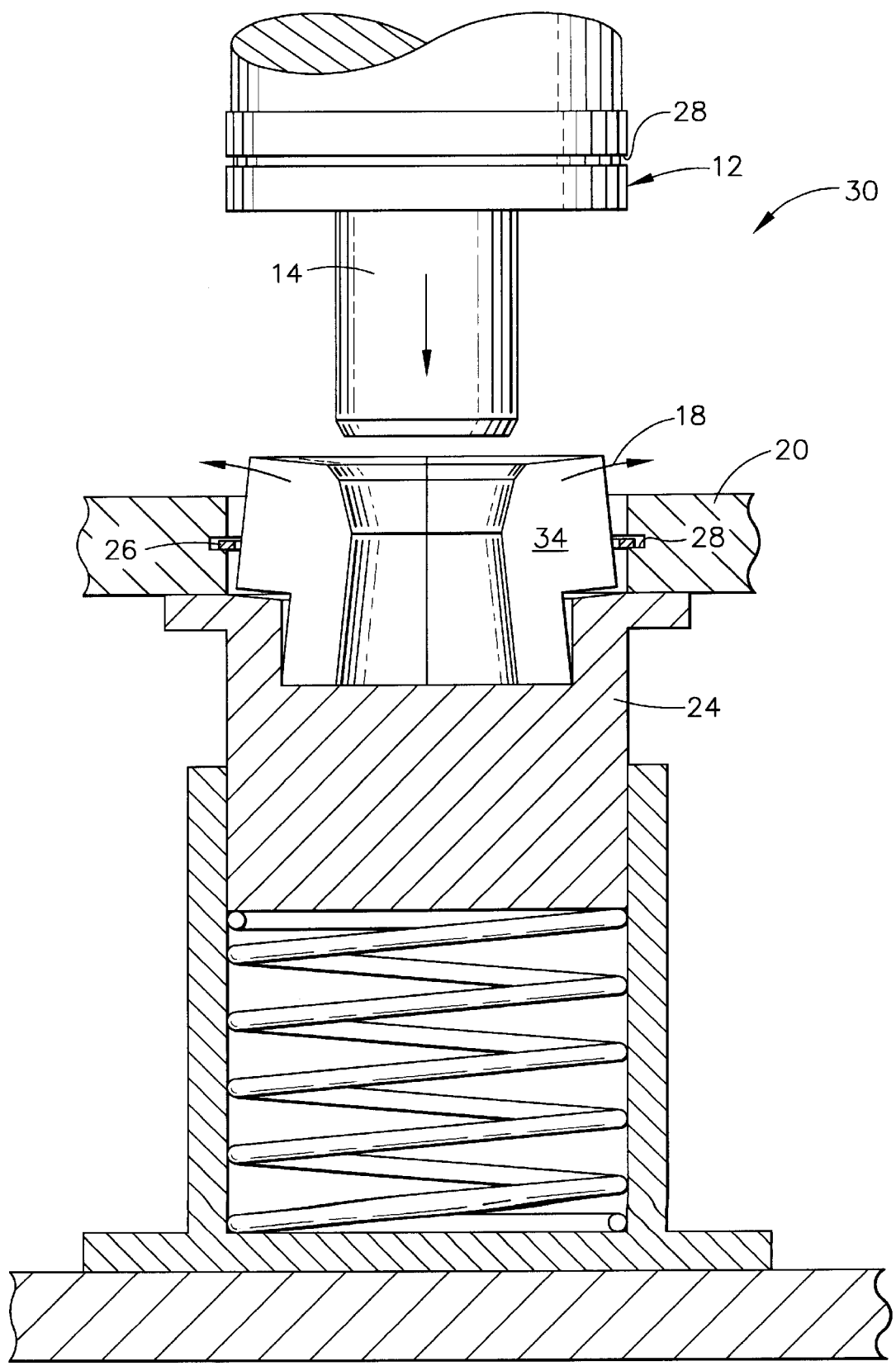
Figure 3:
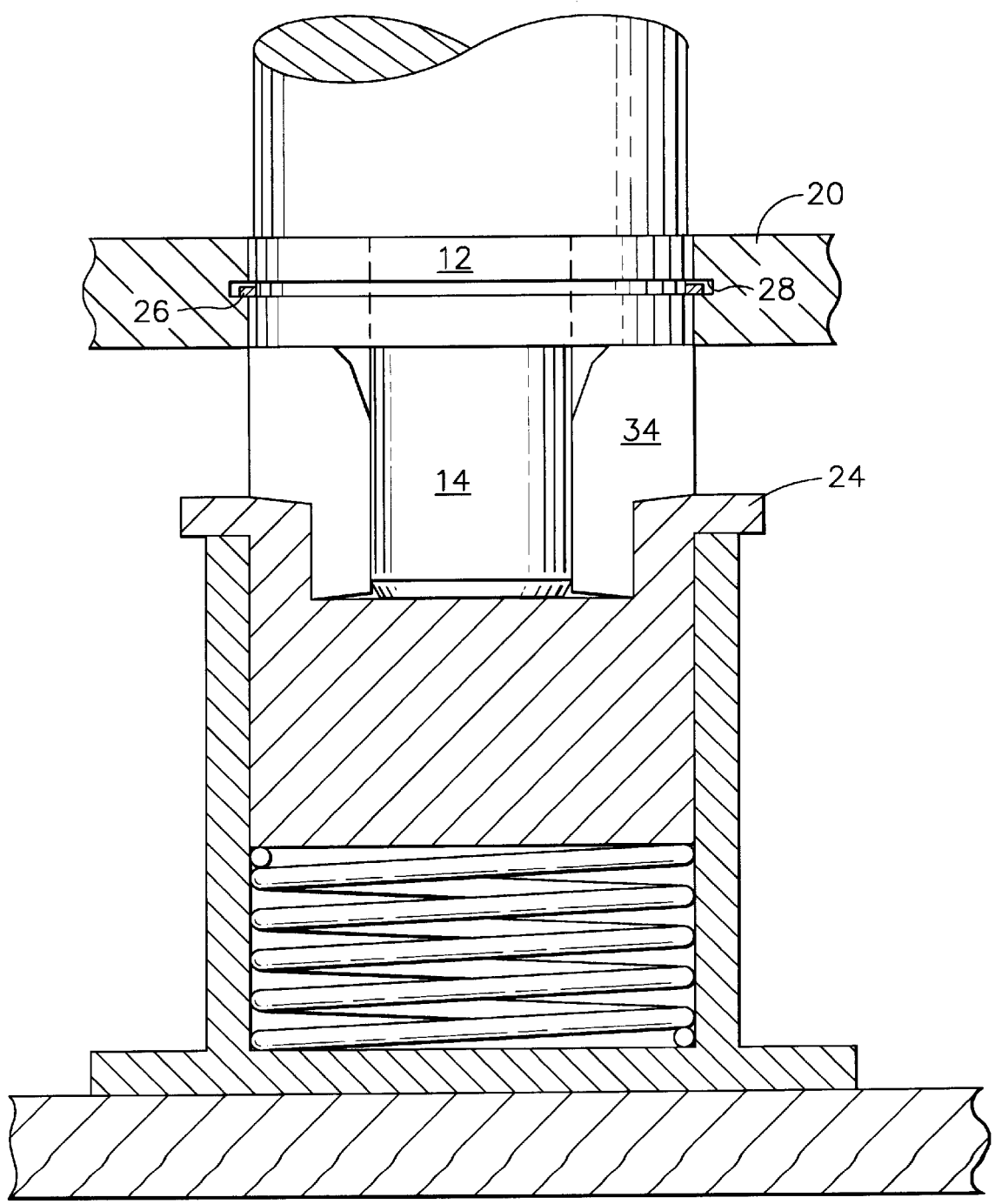

In a transmission assembly process, as illustrated in FIGS. 1–3, a transmission assembly 10 includes a bearing 12, held with a spreader pin 14. The spreader pin 14 is inserted into bearing aperture 16, which spreads open in the direction of arrows 18 to receive the bearing 12. The bearing 12 is pressed into the rear of transmission and torque converter case 20. Spreader segments 34 in lower jig 24 expand the previously installed snap ring 26. When the spreader pin 14 is in aperture 16, the snap ring is supposed to snap into position in snap ring groove 28. If the snap ring 26 is not properly positioned in the snap ring groove 28, or is offset in the groove 28, the transmission case 20 can break.

Figure 4:
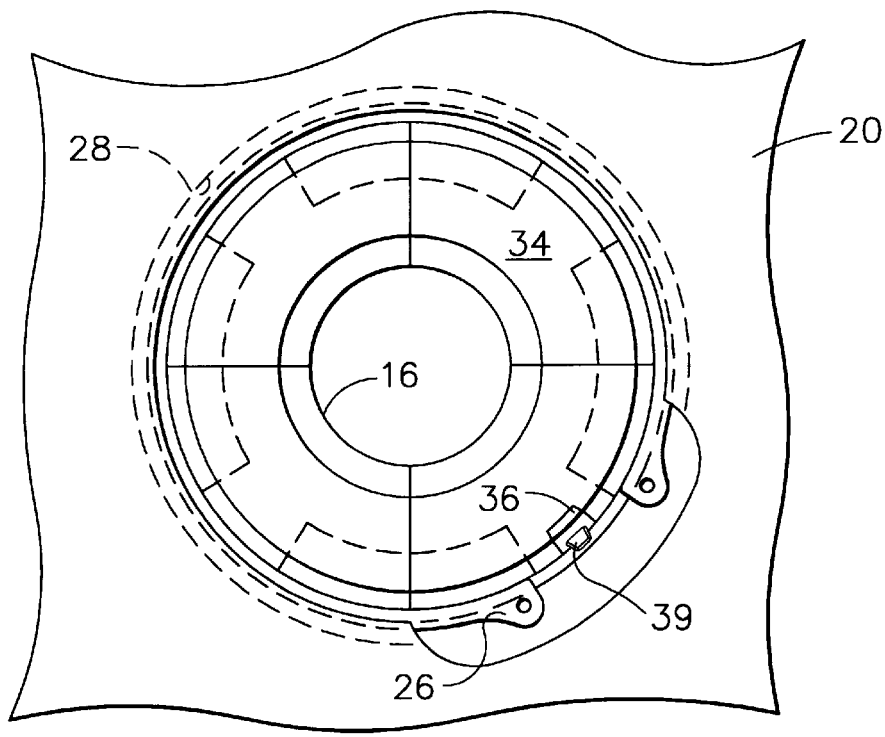
FIGS. 4 and 5 are top views of the transmission assembly process of FIGS. 1–3, with FIG. 4 illustrating a properly oriented snap ring, and FIG. 5 illustrating an improperly oriented snap ring, to illustrate the snap ring detection technique of the present invention.
Figure 5:
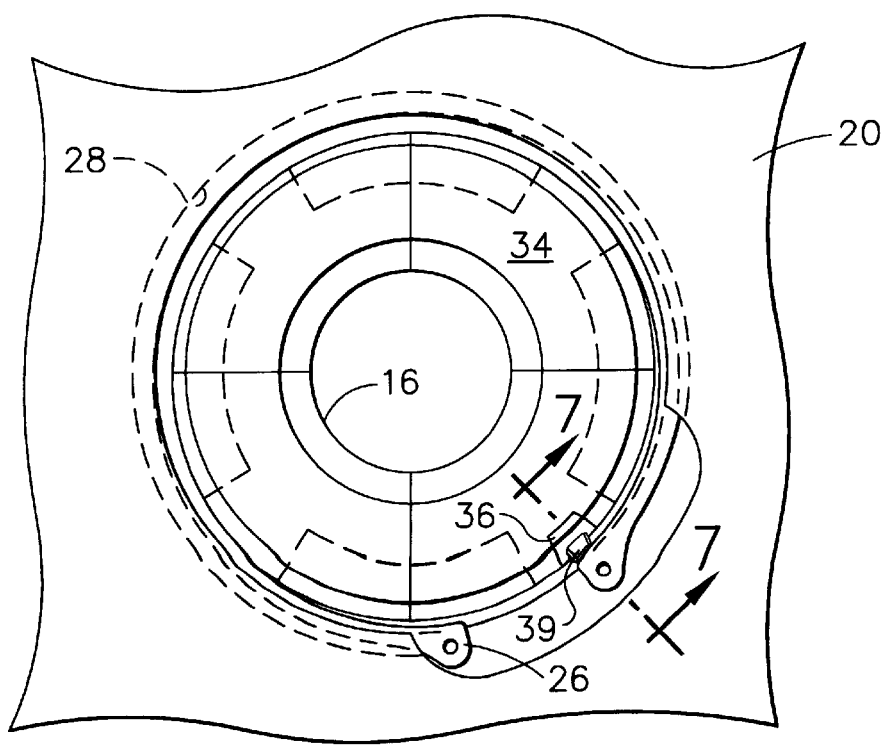

The present invention addresses the problem of determining whether the snap ring is correctly positioned, by proposing a novel snap ring detection technique. Referring now to FIGS. 4 and 5, a bearing/snap ring location detection system is illustrated. The present invention detects and confirms the location of the snap ring 26 which is used to secure the bearing 12 in the transmission and torque converter case 20. This is accomplished by machining or otherwise introducing a slot into spreader segment 34. The slot is configured to contain a contact strip 36, having a conductive surface 38 with a raised contact 39, as in FIGS. 4, 5 and 6, and a non-conductive backing 40. The contact strip 36 can be connected by any suitable means to the spreader segment 34, such as by using tapped holes and tapered holes 44 for fastening and mounting, and is preferably flush with the exterior surface of spreader segment 34. The raised contact 39 extends beyond the conductive surface 38, as seen in FIGS. 4–6.

Figure 6:
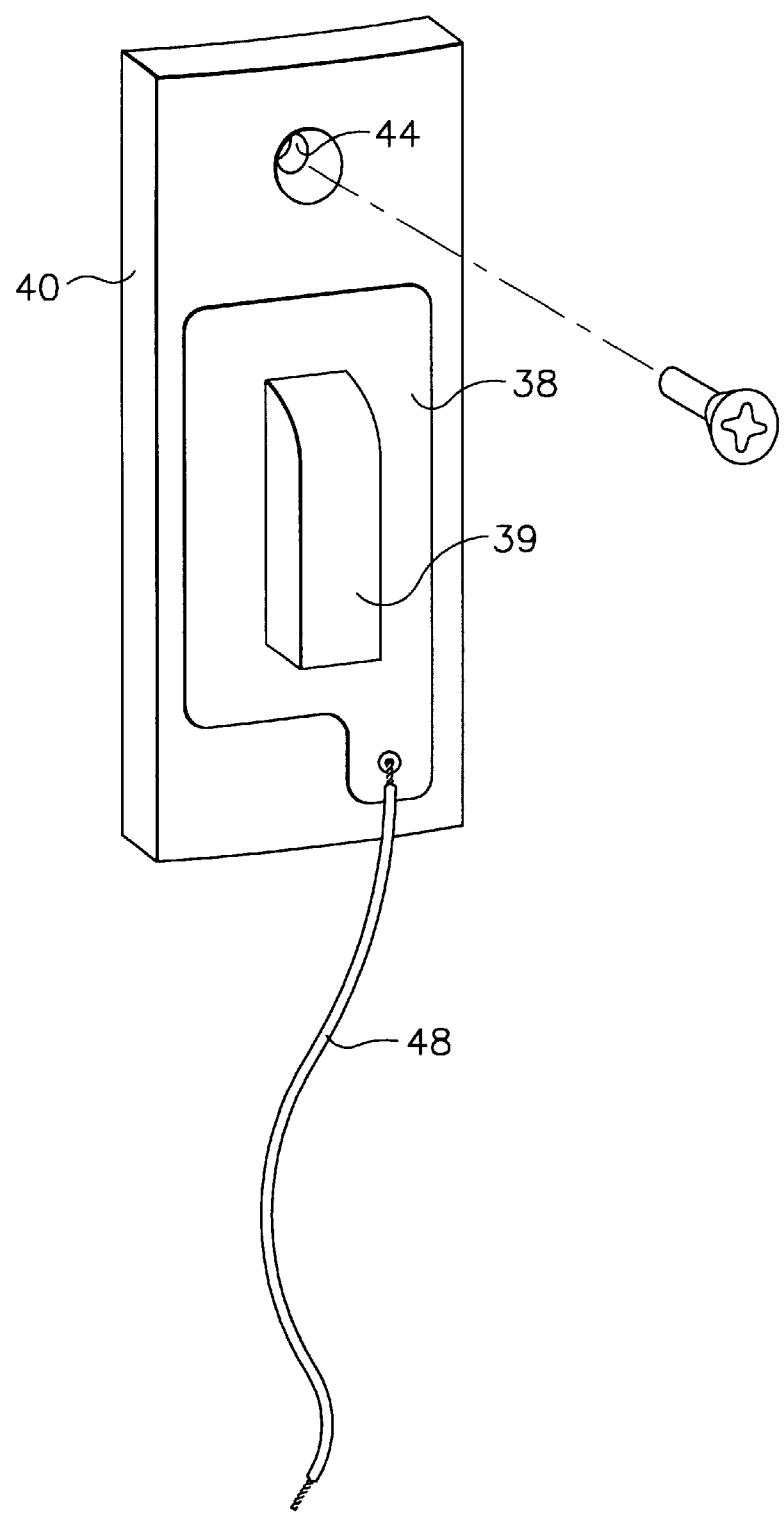
FIG. 6 is an enlarged view of the contact sensor means of the present invention for detecting the position of the snap ring.
Figure 7:
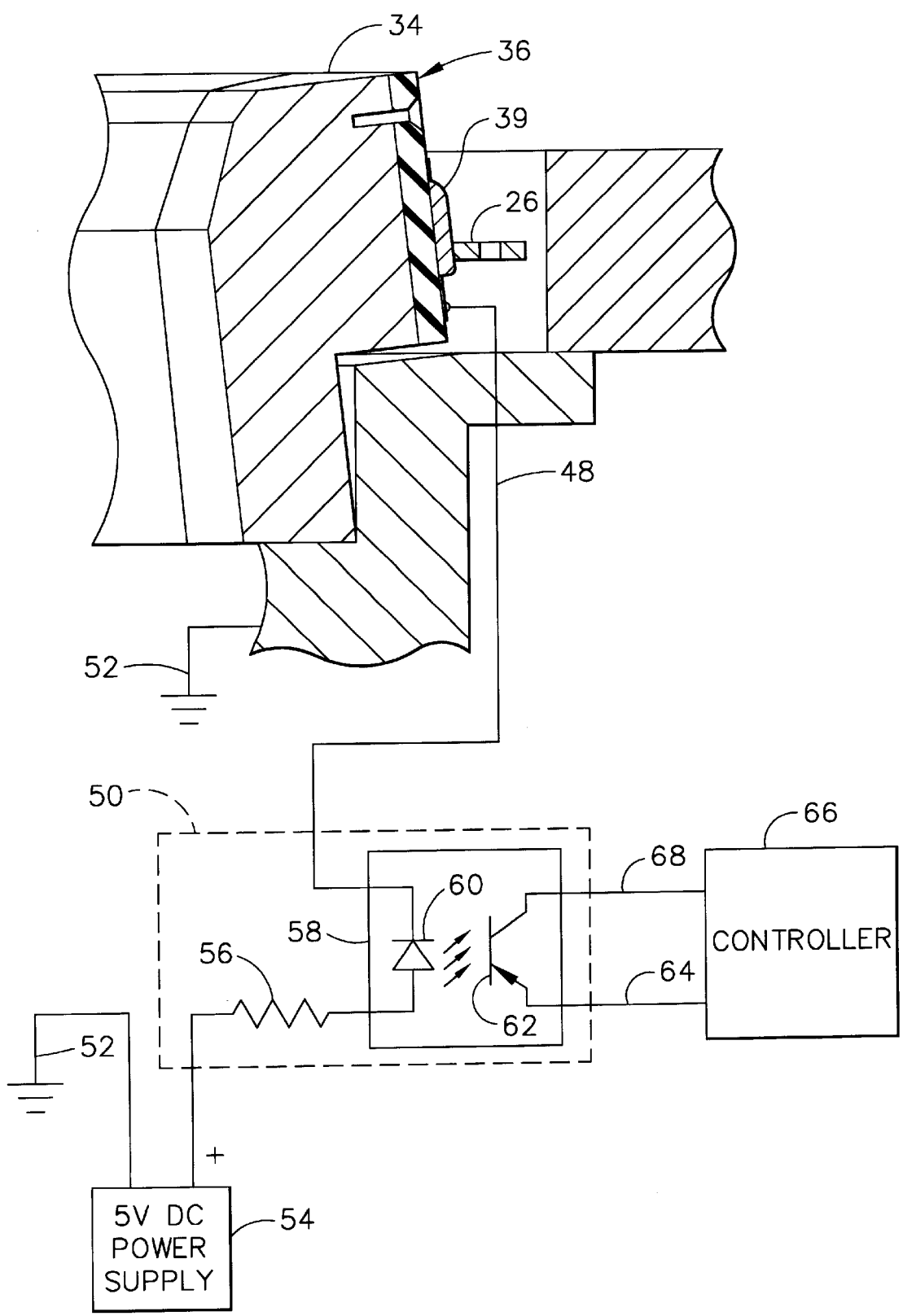
FIG. 7 is a schematic block diagram illustrating the electrical configuration for detecting the position of the snap ring in accordance with the present invention.

Continuing with FIGS. 4–6, and referring also to FIG. 7, a sensing wire 48 is in contact with contact strip 36 at one end and an interface circuit 50 at an opposite end, to detect the position of snap ring 26. In accordance with the present invention, snap ring 26, typically manually installed in the transmission and torque converter case 20, is used to secure the main, secondary, and countershaft bearings 12 in the case 20. The snap ring 26 is expanded by spreader segments 34 to allow the bearing to be received and installed in the transmission and torque converter case 20. Now, with the present invention, if the snap ring 26 is not located in the correct position, as illustrated in FIG. 4, during the installation process, i.e., when the spreader segments 34 start to expand outward, or is offset in its location, as illustrated in FIG. 5, the raised contact 39 or conductive strip 36 makes contact with the snap ring 26, alerting the operator that the snap ring position is incorrect, before the transmission case is compromised.

As illustrated in FIG. 7, when an improperly positioned snap ring, such as is illustrated in FIG. 5, makes contact with the raised contact 39, an electric current is allowed to flow from frame ground 52, through the spreader segments 34 (which are making contact with the snap ring 26), to the raised contact 39 and conductive strip 36. The sensing wire 48, which is connected to the conductive strip 36, provides a path through the interface circuit 50 and back to power supply 54. Resistor 56 of the interface circuit 50 can be employed to limit the current through opto-isolator 58 to any desired value such as, in the example shown, 5VDC/1000 ohms, or 0.05 amps. As current flows through LED 60 of opto-isolator 58, the optical transistor 62 is switched on, or forward biased, sending an output 64 to the control electronics for the machine, or external controller 66. External controller 66 has a common ground 68 to the opto-isolator 58, as shown in FIG. 7.

Conversely, if the snap ring 26 is properly positioned to be received into snap ring groove 28, as illustrated in FIG. 4, the raised contact 39 will not make contact or complete a circuit with interface circuit 50. Such a condition confirms that the snap ring is located properly so as not to compromise the transmission case 20. With the present invention, therefore, the location of the snap ring can be determined, alerting an operator to an incorrect positioning, and confirming a correct positioning.

Having described the invention in detail and by reference to the preferred embodiment thereof, it will be apparent that other modifications and variations are possible without departing from the scope of the invention defined in the appended claims.

What is claimed is:

1. A detection system for detecting position of a snap ring in a bearing assembly of a transmission system having a transmission and torque converter case, the detection system comprising:

a spreader pin for insertion in spreader segments;

a bearing for installation in the spreader segments;

spreader segments for receiving the bearing; and a conductive sensor on a surface of the spreader segments, whereby an incorrectly positioned snap ring will make contact with the conductive sensor, causing a current to flow alerting an operator of incorrect snap ring placement.

2. A detection system as claimed in claim 1 further comprising a snap ring groove whereby when the spreader pin is inserted in the spreader segments, the snap ring will snap into position when the snap ring is properly positioned in the snap ring groove.

3. A detection system as claimed in claim 1 further comprising a slot introduced into the spreader segments.

4. A detection system as claimed in claim 3 wherein the slot comprises a conductive surface with a raised contact.

5. A detection system as claimed in claim 4 wherein the conductive surface is flush with an exterior surface of the spreader segments.

6. A detection system as claimed in claim 4 wherein the raised contact extends beyond the conductive surface.

7. A detection system as claimed in claim 6 wherein the raised contact makes contact with the snap ring when the snap ring is incorrectly positioned.

8. A detection system as claimed in claim 1 wherein the snap ring is expanded by the spreader segments to allow the bearing to be received and installed in the transmission and torque converter case.

9. A method for detecting position of a snap ring in a bearing assembly of a transmission system having a transmission and torque converter case, the method comprising the steps of:

inserting a spreader pin in spreader segments;

installing a bearing in the spreader segments;

using spreader segments to receive the bearing; and inserting a conductive sensor on a surface of the spreader segments, whereby an incorrectly positioned snap ring will make contact with the conductive sensor, causing a current to flow alerting an operator of incorrect snap ring placement.

10. A method as claimed in claim 9 further comprising the step of introducing a snap ring groove whereby when the spreader pin is inserted in the spreader segments, the snap ring will snap into position when the snap ring is properly positioned in the snap ring groove.

11. A method as claimed in claim 9 further comprising the step of introducing a slot into the spreader segments.

12. A method as claimed in claim 11 wherein the slot comprises a conductive surface with a raised contact.

13. A method as claimed in claim 12 wherein the conductive surface is flush with an exterior surface of the spreader segments.

14. A method as claimed in claim 12 further comprising the step of extending the raised contact beyond the conductive surface.

15. A method as claimed in claim 14 wherein the raised contact makes contact with the snap ring when the snap ring is positioned incorrectly.

16. A method as claimed in claim 9 further comprising the step of expanding the snap ring by the spreader segments to allow the bearing to be received and installed in the transmission and torque converter case.

* * * * *